United States Patent [19]
Cunningham

[11] 3,783,748
[45] Jan. 8, 1974

[54] CAM FOLLOWER PISTON
[75] Inventor: Sinclair Upton Cunningham, Glasgow, Scotland
[73] Assignee: National Research Development Corporation, London, England
[22] Filed: Sept. 2, 1971
[21] Appl. No.: 177,266

[30] Foreign Application Priority Data
Sept. 2, 1970 Great Britain.................. 42010/70

[52] U.S. Cl....................... 92/249, 91/488, 92/181, 92/240
[51] Int. Cl.............................. F16j 1/02, F16j 1/10
[58] Field of Search...................... 92/172, 181, 240, 92/242, 248, 243, 249, 253; 91/491–498, 488; 264/242; 308/216

[56] References Cited
UNITED STATES PATENTS

| | | | |
|---|---|---|---|
| 2,932,081 | 4/1960 | Witte | 308/DIG. 7 |
| 2,954,992 | 10/1960 | Baker | 264/242 X |
| 3,125,004 | 3/1964 | White | 92/249 X |
| 3,186,352 | 6/1965 | Anderson | 91/506 X |
| 3,191,264 | 6/1965 | Underwood et al. | 287/87 X |
| 3,259,963 | 7/1966 | White | 264/242 X |
| 3,283,725 | 11/1966 | Scott et al. | 92/249 X |
| 3,319,537 | 5/1967 | Pittman | 92/243 X |
| 3,331,288 | 7/1967 | Kolthoff, Jr. | 91/507 |

FOREIGN PATENTS OR APPLICATIONS

| | | | |
|---|---|---|---|
| 1,947,585 | 6/1970 | Germany | 91/491 |
| 1,033,355 | 6/1966 | Great Britain | 91/499 |

Primary Examiner—Irwin C. Cohen
Attorney—Cushman, Darby & Cushman

[57] ABSTRACT

A piston adapted to carry a cam follower and particularly for use as a ball or roller piston in a hydrostatic pump or motor, comprises a piston body having a seating at one end, an insert of low friction material which is shaped to provide in the seating a bearing for the cam follower, and means for securing the insert to the piston body. The piston body preferably has a recess or aperture communicating with the seating and the insert of low friction material extends into or through the recess or aperture to lock the insert to the piston body. The insert is conveniently made of polytetrafluorethylene, nylon or an acetal material.

2 Claims, 12 Drawing Figures

INVENTOR
SINCLAIR UPTON CUNNINGHAM

BY
Cushman, Darby & Cushman
ATTORNEYS

CAM FOLLOWER PISTON

The present invention relates to a piston adapted to carry a cam follower and is concerned in particular, but not exclusively, with ball or roller pistons for use in hydrostatic pumps or motors of rotary or linear types.

A hydrostatic machine is one in which the mechanical output (in the case of a motor) or the mechanical input (in the case of a pump) is a function of the pressure (and thus potential energy) of the working fluid rather than its velocity (and kinetic energy).

In a conventional ball piston hydrostatic machine, each piston comprises a ball which is a close sliding fit in a cylinder bore to which the working fluid, such as oil, is admitted and from which it is exhausted. The balls operate as cam followers, engaging a cam track which moves relative to the cylinders in which the ball pistons reciprocate.

At low rates of reciprocation of the ball piston, oil leakage past the ball can rise to a significant proportion of the total amount fed to the cylinder. As the ball must be free to rotate within the cylinder to act as a cam follower, it is not possible to reduce the oil leakage by providing any form of pressure seal on the ball.

It has been proposed previously to provide an auxiliary piston to reduce the leakage past the ball, and this has taken the form of a substantially rigid disc having a sliding fit in the cylinder bore of the ball piston, and providing a seating for the ball. It has proved difficult in such an arrangement to reduce the friction between the disc and the ball.

In accordance with the present invention there is provided a piston comprising a piston body having a seating at one end, an insert of low friction material which is shaped to provide in the seating a bearing for a cam follower and means for securing the insert to the piston body.

Preferably the means for securing the insert to the piston body is provided by the shape of the insert and/or the seating, the shape of the insert and/or the shape of the seating being such that the insert is locked to the piston body by co-operation with the seating.

There is also provided a piston comprising a piston body having a seating at one end and a recess or aperture in the piston body communicating with the seating and an insert of low friction material which is shaped to provide in the seating a bearing for a cam follower and which extends into or through the recess or aperture, the shape of the insert and/or the shape of the recess or aperture being such that the insert is locked to the piston body by its extension into or through the recess or aperture.

Alternatively or in addition, the securing means may comprise projections projecting from the seating into the insert.

Preferably the piston body has an aperture which extends from the seating to an end face of the piston body remote from the seating the insert extending into the aperture. The said insert may have a flange extending over at least part of the said end face of the piston body. That part of the insert which extends through the said aperture may have a passageway leading from the said end face of the piston body to the surface of the bearing in the seating, and allowing lubrication of the bearing in operation.

In accordance with one aspect of the invention the said piston body has with an aperture extending from the seating to the said end face of the body remote from the seating or to the side wall of the piston body, the said insert extending through the said aperture and forming around the perimeter of the said end face or side wall of the piston body a sealing ring adapted to engage the inner face of a bore within which the piston is fitted in operation.

Thus the aperture may extend axially of the piston body to the end face of the body remote from the seating, or may extend at right angles to the axis of the piston body, and form the seal in a circumferential groove in the wall of the piston body.

It is preferred that the said insert consists of a single body moulded in situ in the said aperture or recess, for example by injection moulding.

A further alternative means of fixing the insert into the piston is by shaping the stem portion so that it acts as a dip enabling the bearing portion to be snapped into the piston body.

The said securing means may comprise an adhesive.

It will be appreciated that more than one aperture and/or recess may be provided in the piston body to accommodate the insert. In some cases it may be preferable to provide a plurality of axial apertures extending from the seating to a flange of the insert which extends over the end face of the piston body remote from the seating. Where the insert is injection moulded such a plurality of passages are filled by the insert and reduce the effects of shrinkage of the insert, which otherwise might cause the insert to separate from the seating.

Thus there is provided in accordance with a further aspect of the invention a method of making a piston including the step of moulding in situ in a piston body having a seating at one end and a recess or aperture in the piston body communicating with the seating, an insert of low friction material which is shaped to provide in the seating a bearing for a cam follower, and which extends into or through the recess or aperture, the shape of the insert and/or the shape of the recess or aperture being such that the insert is locked to the main body by its extension into or through the recess or aperture.

The method may include the steps of inserting a cam follower in the bearing and so shaping the piston body in the region surrounding the seating as to retain the cam follower in operation. The method may include the step of rolling the piston body over the cam follower in such a manner as to retain the cam follower in operation.

It is preferred that the said insert is of synthetic plastics material. Conveniently the said insert may be made of polytetrafluorethylene, nylon, or an acetal material such as "Delrin" or "Kemetal."

The cam follower provided in operation in the said seat may be a ball, as for example in the case of a ball piston hydrostatic machine, or may be a roller.

Embodiments of the invention will now be described by way of example with reference to the accompanying drawings in which.

Figure 1:
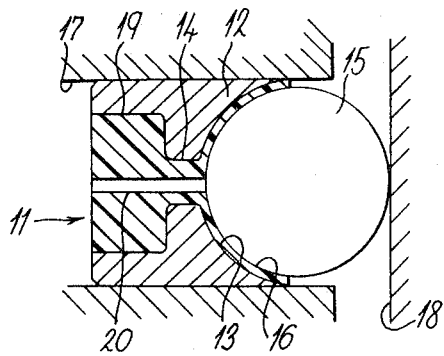
FIG. 1 is an axial section of a ball piston for a hydrostatic machine, and embodies the present invention.
Figure 9A:
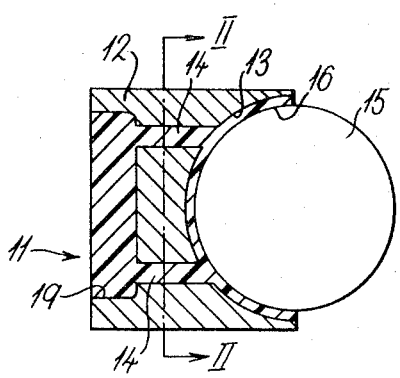
Figure 9B:
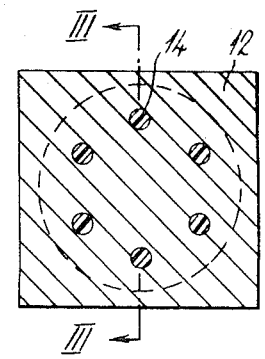
Figure 10:
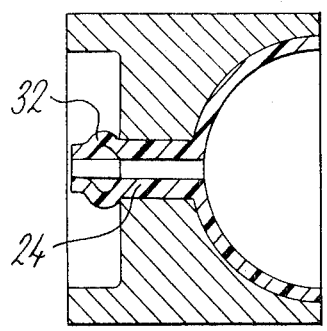
Figure 11:
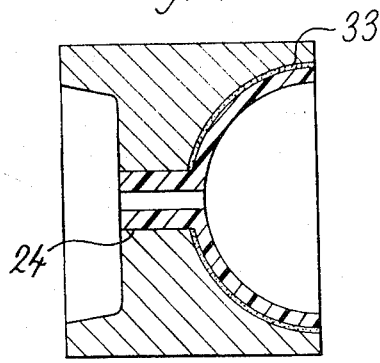

FIGS. 9(a) and 9(b) are longitudinal and cross-sections respectively of a piston modified with regard to that of FIG. 1 by having a plurality of apertures in the piston body; and FIGS. 10 and 11 illustrate further modified pistons.

In FIG. 1 there is shown a piston for a ball piston hydrostatic pump or motor. The piston 11 comprises a piston body 12 having a seating 13 at one end of the piston body, and an aperture 14 extending from the seating 13 axially of the piston body 12 to the other end thereof. The seating 13 is shaped to receive a ball cam follower 15, and the seating 13 is lined by an insert 16 which forms a bearing for the ball 15. In operation, the piston 11 reciprocates in a cylinder bore 17 under the action of a cam track 18 which is engaged by the ball 15. When used in a hydrostatic machine, the bore 17 is filled with a working fluid such as oil.

The insert 16 is preferably of plastics material and is of substantially lesser friction relative to metal than the piston body 12, which is conveniently of metal, as is the ball 15. The insert 16 extends through the aperture 14 and fills a recess 19 in the end face of the body 12 remote from the seating 13. The diameter of the recess 19 is greater than that of the aperture 14, so that the insert 16 is mechanically locked in position in the piston body 12. The insert 16 has a lubrication hole 20 along the axis of the body communicating between the seating 16 and the end face of the body remote from the seating.

In the arrangements shown in FIGS. 1 to 9 the insert 16 is conveniently moulded in situ into the piston body 12, the mould being formed partly by the body 12 and partly by additional mould components to shape the seating 13 (and where necessary, the end face of the insert 16 remote from the seating). Preferably a low friction plastics material such as polytetrafluorethylene is used and is injection moulded.

Figure 2:
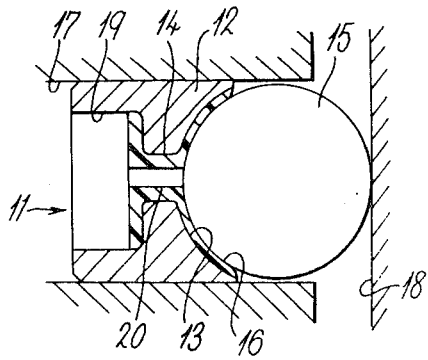
FIGS. 2, 3 and 4 are sections of modifications of the piston shown in FIG. 1.
Figure 3:
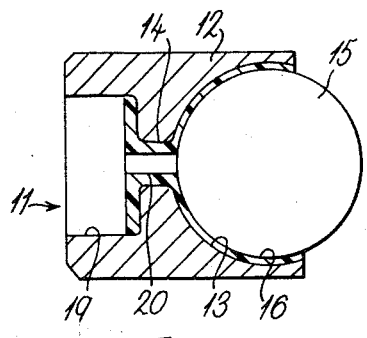
Figure 4:
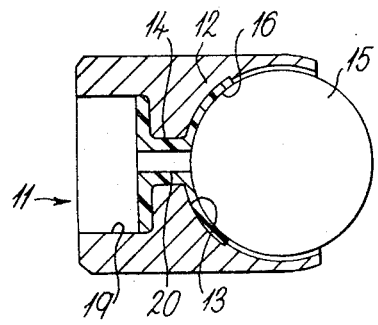

FIGS. 2, 3 and 4 show modifications of the piston of FIG. 1. In FIG. 2, the piston body diameter is only slightly larger than the diameter of the ball 15 to minimise stresses between the ball and the cam. In FIG. 3 the ball 15 is moulded into the piston body so that it is retained by the insert 16. In FIG. 4 the end of the piston body 12 surrounding the seating 13 is rolled over the ball to retain the ball 15.

Figure 5:
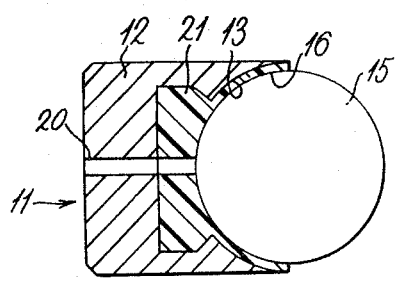
FIGS. 5 and 6 are sections of pistons modified with regard to that of FIG. 1 by the replacement of an aperture in the body of the piston by a recess or recesses.
Figure 6:
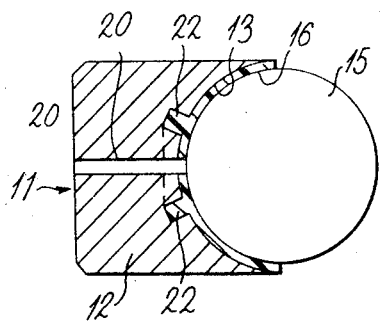

FIGS. 5 and 6 show modifications of the piston of FIG. 1, in which recesses 21 and 22 are provided in place of the aperture 14. The shape of the recesses 21 and 22 is such that the insert is locked to the piston body 12.

Figure 7:
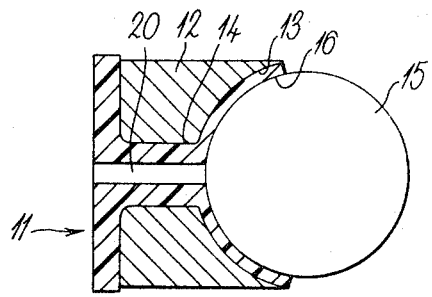
FIGS. 7 and 8 are sections of modifications of the piston of FIG. 1, in which an insert in the body of the piston provides one and two piston seals respectively.
Figure 8:
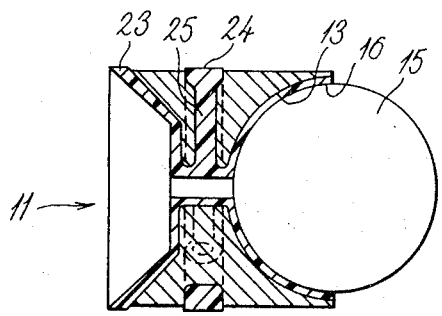

FIG. 7 illustrates a modification of the piston of FIG. 1 in which the insert 16 extends over the whole of the face of the piston body remote from the seating 13, with the exception of the lubrication channel 20. The perimeter 23 of the insert 16 at the end remote from the seating 13 is arranged to provide a seal against the wall of the cylinder bore 17. FIG. 8 shows a further modification in which a first seal is provided by a piston ring 24 formed by a perimeter of the insert 16 extending through three radial apertures 25 at right angles to the axis of the body 12, and a second seal is provided by the perimeter 23 of the insert where the insert extends over the end face of the piston remote from the seating 13.

FIGS. 9(a) and 9(b) show respectively longitudinal and cross-sections of a further modification of the piston of FIG. 1 which includes a plurality of axial apertures 14 in the body 12.

When the insert 16 is injection moulded, a small amount of shrinkage of the plastic may occur causing the insert to tend to separate from the seating 13 on the piston. To overcome this a number of apertures 14 may be drilled in the piston body from the spherical seating 13 through into rear face of the piston. The shrinking of the plastic which fills these holes 14 pulls the plastic insert 18 back on to the spherical surface 13 of the piston.

In FIG. 10 the free end of the stem portion 24 is formed with a spring clip 32 which contracts while the stem portion is being pushed into the aperture 14 and expands when it reaches the wall 19 so as to lock the insert in position.

In FIG. 11 an insert 16 is secured to the piston body 12 by an adhesive 33.

Although the invention has been described by way of example with regard to the provision of an aperture or recess in the seating to lock the insert in position, it will be appreciated that the seating of the piston body may be shaped with protuberances or castellations extending into the insert of low friction material to effect locking of the insert to the piston body.

The present invention is related to an improved cam follower piston disclosed in a co-pending U.S. application based on U.K. application No. 42010/70.

I claim:

1. A piston for a hydrostatic machine comprising:
   a freely rotating cam follower member for following a cam surface in a hydrostatic machine by reciprocatory motion of the cam follower member in a cylinder bore of the machine;
   a piston body for reciprocatory travel along said cylinder bore, said piston body having at one end a working face for exposure to the working fluid of said hydrostatic machine, and at the other end a seating face defining a seating for said cam follower member, but exposing a portion of said cam follower member protruding from said piston body to engage a cam surface, said piston body having an aperture extending from said seating to said working face of said piston body;
   an insert of low friction synthetic plastics material positioned between said cam follower member and said seating in said piston body and having an internal bearing surface for said cam follower member, said insert having an extension which extends through said aperture in said piston body and locates said insert in said piston body, said insert having a flange extending over at least part of said working face of said piston body and forming around the perimeter of said working face a sealing ring adapted to engage the inner surface of said cylinder bore within which said piston body reciprocates in use.

2. A piston for a hydrostatic machine comprising:
   a freely rotating cam follower member for following a cam surface in a hydrostatic machine by reciprocatory motion of the cam follower member in a cylinder bore of the machine;
   a piston body for reciprocatory travel along the cylinder bore, said piston body having at one end a working face for exposure to the working fluid of said hydrostatic machine, and at the other end a seating face defining a seating for said cam follower member but exposing a portion of said cam follower member protruding from said piston body to engage a cam surface, said piston body having at least one aperture extending from said seating to a side wall of said piston body;

an insert of low friction synthetic plastics material positioned between said cam follower member and said seating in said piston body and having an internal bearing surface for said cam follower member, said insert extending through said at least one side wall aperture and forming around the perimeter of said side wall a sealing ring adapted to engage the inner surface of said cylinder bore within which said piston body reciprocates in use.

* * * * *